Nov. 18, 1958     S. W. SOOS, JR     2,861,198
TRANSFER SWITCH
Filed Oct. 17, 1956     3 Sheets-Sheet 1
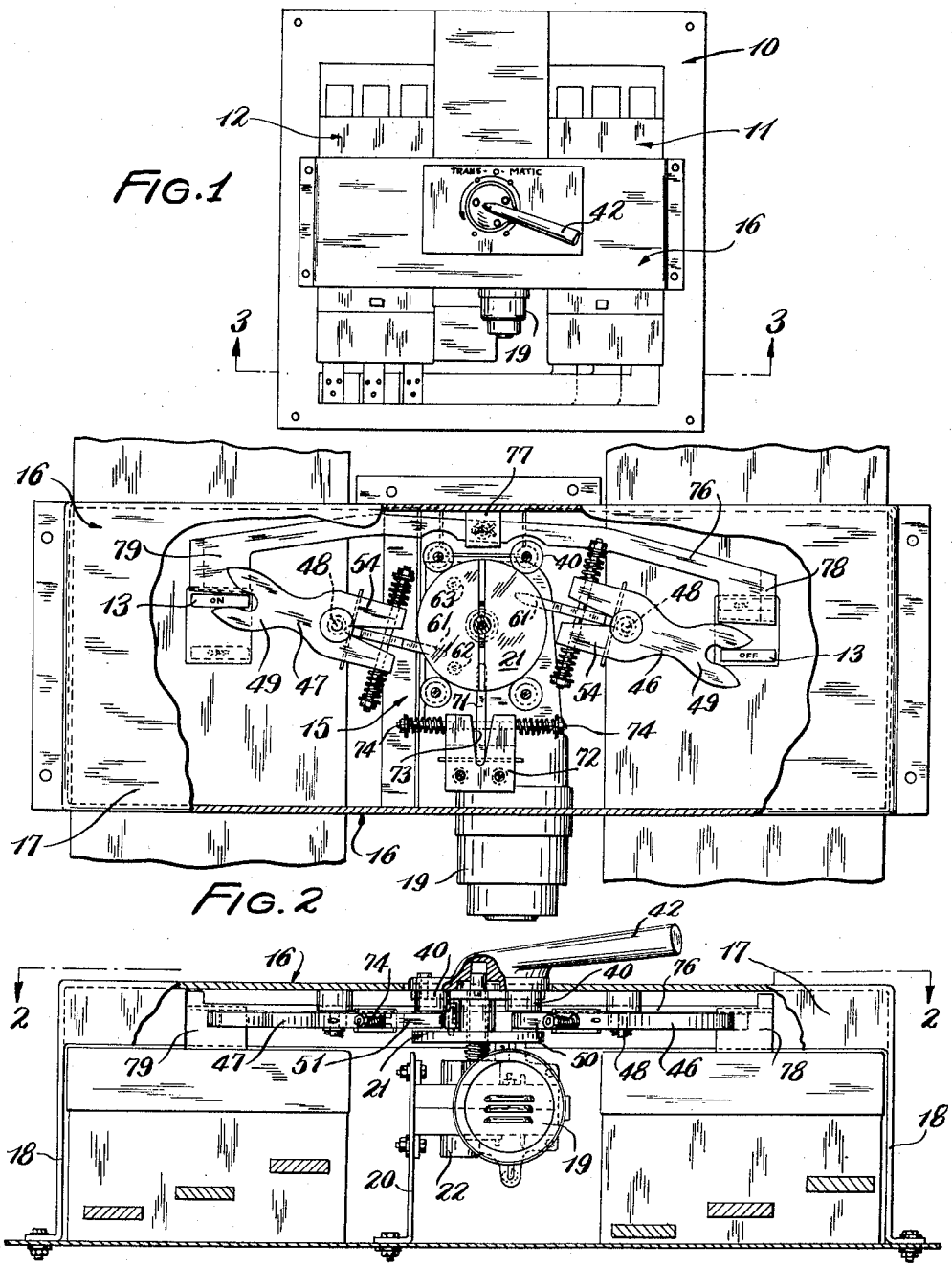
INVENTOR.
STEVEN W. SOOS, JR.
BY Hudson, Boughton,
Williams, David & Hoffmann
ATTORNEYS Nov. 18, 1958  S. W. SOOS, JR  2,861,198
TRANSFER SWITCH
Filed Oct. 17, 1956  3 Sheets-Sheet 2

INVENTOR.
STEVEN W. SOOS, JR.
BY Hudson Boughton,
Williams, David & Hoffmann
ATTORNEYS United States Patent Office  2,861,198
Patented Nov. 18, 1958

2,861,198

TRANSFER SWITCH

Steven W. Soos, Jr., Brecksville, Ohio, assignor to The Controllix Corporation, a corporation of Ohio Application October 17, 1956, Serial No. 616,431

19 Claims. (Cl. 307—64)

The present invention relates to transfer switch mechanisms and, more particularly, to such mechanisms for automatically transferring an electrical load from its normal power supply when the latter fails to an emergency power supply.

The principal object of the present invention is to provide a transfer switch mechanism for automatically switching a load from a first power supply circuit to a second power supply circuit when the power in the former circuit fails and to return the load to the former circuit upon restoration of power, which transfer mechanism is reliable in operation, simple in construction, and installable in a relatively small space.

Another object is to provide a transfer mechanism for transferring a load from one power supply to another upon the occurrence of a predetermined condition, which mechanism does not have a neutral point between its two positions for connecting the load to respective power supplies, and which is preferably so constructed that it may be readily and quickly converted to manual operation.

Still another object of the present invention is the provision of the type of transfer mechanism described which is in the form of a conversion unit and is readily applied to a pair of side-by-side circuit breakers.

A further object is to provide a new and improved transfer switch mechanism of the type described in which a rotatable cam member is driven by a reversible motor in one direction to transfer a load from a first power supply to a second power supply, and in the opposite direction to return the load to the first power supply, the motor preferably operating automatically upon failure of the first power supply and energization of the second power supply to transfer the load from the first power supply and, upon restoration of power in the first power supply, to return the load to the latter power supply.

A still further object of the present invention is to provide in a transfer mechanism of the type described a rotatable cam member which engages yieldable tongue members carried by levers for operating circuit breakers for connecting the load to respective power supplies, the tongue members yielding to permit the cam member to move thereby and to engage the tongue and move the latter in the opposite direction upon the reversal of the direction of rotation of the cam member.

The present invention resides in certain constructions and combinations and arrangements of parts and further advantages and objects of the present invention will be apparent from the following detailed description made with reference to the accompanying drawings forming a part of this specification for all matters shown therein, whether or not expressly described, and in which:

Fig. 1 is an elevational view of a transfer switch mechanism embodying the present invention;

Fig. 2 is an enlarged cutaway view of a portion of the switch mechanism shown in Fig. 1;

Fig. 3 is a sectional view taken approximately along line 3—3 of Fig. 1 with parts broken away;

Figure 4:
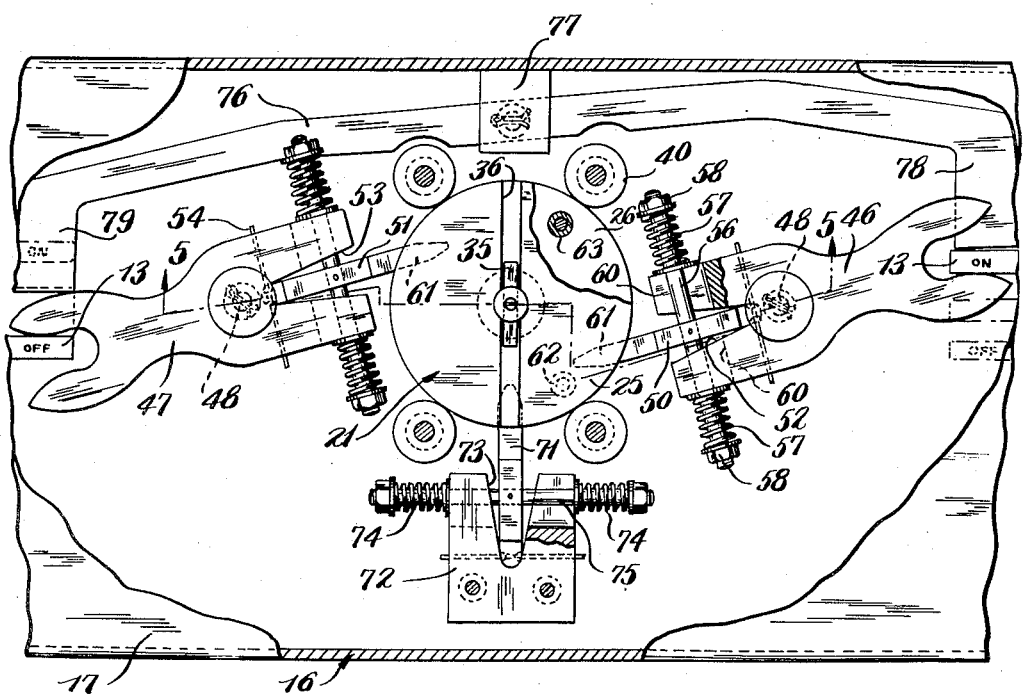
Fig. 4 is an enlarged view of the cutaway portion of Fig. 2.
Figure 5:
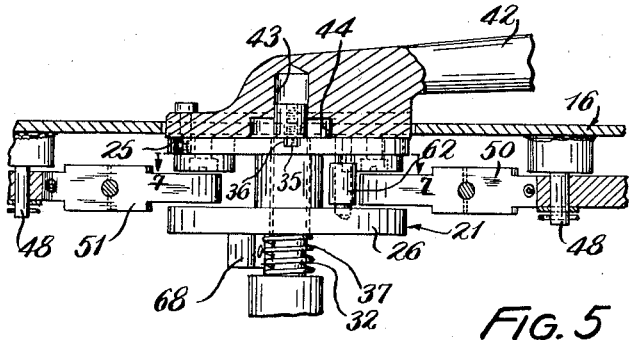
Fig. 5 is an enlarged detail view of a portion of Fig. 5 showing the transfer mechanism in position for automatic operation.
Figure 6:
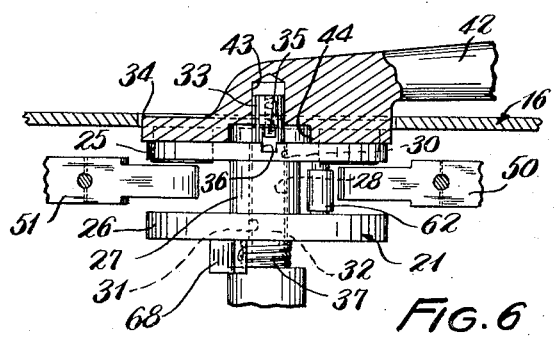
Fig. 6 is a view corresponding to Fig. 5 by showing the position of the parts for manual operation.

While the present invention is susceptible of various constructions and modifications and of uses wherever it is desired to connect a load with either one of two power supplies, either automatically or manually, it is particularly suitable for use in transferring a load from its normal power supply upon the failure of the latter to an emergency power supply upon energization of the latter and to return the load to its normal power supply when the latter is restored.

Referring to Fig. 1, the invention is shown as applied to a switchboard 10 having a circuit breaker 11 for connecting a load to its normal power supply and a circuit breaker 12 for connecting the load to an emergency power supply. The details of the circuit breakers 11, 12 are not shown and will not be described since the circuit breakers may be of any conventional construction. Suffice it to say, that the circuit breakers 11, 12 each have a handle 13 which is movable vertically between "on" and "off" positions, the "on" position being uppermost, and the "off" position lowermost in the illustrated circuit breakers.

To transfer the load from one power supply to the other power supply, the circuit breakers 11, 12 are provided with a transfer mechanism 15 mounted in a pan 16 that spans the circuit breakers 11, 12 and opens inwardly toward the breakers. The pan has a bottom 17 and end walls 18 which are fastened to the switchboard 10. The transfer mechanism 15 is supported within the pan 16 and comprises, in the preferred and illustrated embodiment, a reversible electric motor 19 which is energized to effect a transfer of the load between the switches 11, 12. The motor 19 is supported by a support member 20 extending transversely of the pan 19 in the central portion thereof and drives a rotatable cam member 21 positioned adjacent the inner side of the bottom 17 of the pan through a double worm reduction gear drive enclosed within a gear box 22. The motor 19 is fastened to the housing of the gear box 22 with the gear box, in turn, being supported by the transverse support member 20.

The cam member 21 comprises a pair of parallel plates 25, 26 which are circular in configuration and connected by a bushing 27 positioned coaxially with the plates. The bushing 27 has an axial opening 28 extending the length thereof and aligned with axial openings 30, 31 in the plates 25, 26. A drive shaft 32 from the gear box 22 which is positioned adjacent the plate 26, extends through the openings 31, 28 and 30 and has a portion 33 extending outwardly of the plate 25 and through an opening 34 in the bottom 17 of the pan 16. The cam member 21 is free to rotate on the shaft 32 and is connectable to the shaft so as to be driven thereby by a key 35 carried by the portion 33 of the shaft outward of the plate 25 and extending radially of the shaft. The key 35 is receivable in a slot 36 in the adjacent side of the plate 25 of the cam member 21. The cam member 21 is biased toward a position with the key 35 positioned in the slot 36 by a spring 37 interposed between the housing of the gear box 22 and the plate 26. The cam member 21 may be moved toward the gear box 22 against the action of the spring 37 to disengage the key 35 from the slot 36.

The cam member 21 is supported and guided for rotional movement by a plurality of rollers 40, four in the illustrated embodiment, spaced about the periphery of the cam member and defining a rectangle in the illustrated embodiment. The rollers 40 are rotatably supported on stub shafts extending inwardly from the bottom 17 of the pan 16 and engage the periphery of the plate 25 of the cam member. The length of the rollers 40 is sufficient to maintain engagement with the plate 25 when the cam member 21 is depressed against the action of the spring 37 to disengage the key 35 from the slot 36.

An operating handle 42 extends through the opening 34 and is fastened to the outer side of the plate 25 adjacent the portion 33 of the shaft. The operating handle has a bore 43 therein which receives the shaft portion 33 and which permits relative axial movement between the shaft portion 33 and the handle when the handle is pushed inwardly to move the cam member 21 against the action of the spring 37. The bore 43 in handle 42 is counterbored at its outer end as indicated by the reference numeral 44 to provide clearance for the key 35 when the cam member 21 is depressed.

As pointed out hereinbefore, rotation of the cam member 21 causes the operation of the circuit breakers 11, 12. The cam member 21 is interconnected with the circuit breakers by pivoted actuating levers 46, 47 positioned on opposite sides of the cam member 21 adjacent the handles 13 for operating the circuit breakers 11, 12, respectively. The levers 46, 47 are pivoted on stub shafts 48 extending inwardly from the bottom 17 of the pan 16 so as to pivot in a plane parallel to the plane of the cam member 21 which is a vertical plane in the illustrated embodiment. The end portions 49 of the levers 46, 47 adjacent the handles 13 are bifurcated to receive the handle 13 of the adjacent circuit breaker. Rotation of the levers 46, 47 in a clockwise direction, as viewed in Fig. 4, about their shafts 48, will move the circuit breakers to one of their positions, while rotation of the levers in a counterclockwise direction will operate the circuit breakers to the other of their positions. When the lever 46 is rotated clockwise, the handle 13 of circuit breaker 11 is moved downwardly to its "off" position, and when rotated counterclockwise the handle is moved upwardly to its "on" position. When the lever 47 is rotated clockwise, the handle 13 of circuit breaker 12 is actuated to its "on" position, while when the lever is rotated counterclockwise, the handle is actuated to its "off" position.

To provide a drive connection between the levers 46, 47 and the cam member 21, the levers 46, 47 have tongue elements 50, 51 positioned in V-shaped cutouts 52, 53 in the end portions 54 thereof adjacent the cam member 21. The tongue elements 50, 51 extend from the cutouts toward the cam member 21 and between the plates 25, 26. The tongue elements are positioned in the V-shaped cutouts 52, 53 in the levers 46, 47 and each is secured at its inner end to the respective lever by a pin 55 which passes through the lever and through an enlarged opening in the inner end of the respective tongue element. The pins 55 and the V-shaped cutouts permit rocking movement of the pin in a vertical plane.

The tongue elements are urged to a central position in the V-shaped cutouts 52, 53 by spring-biasing means. The spring-biasing means is the same for both levers 46, 47 and, therefore, will be described with reference to the lever 46. A shaft 56 is fixed to the tongue element 50 and extends transversely of the V-shaped cutout 52 and outwardly of the side edges of the lever 46. The opposite end portions of the shaft 56 have springs 57 coiled thereabout which abut the adjacent side edges of the lever at their ends and nuts 58, threaded onto the ends of the shaft, at their other ends. The end of the lever 46 facing the cam member 21 is provided with notches 60 in which the shaft 56 is positioned. It can be seen that the mounting for the tongue element 50 will allow it to move in the plane of rotation of the lever 46 against the action of the springs 57 in limited amounts in either direction from its central position shown in the drawings.

The outer end portions 61 of the tongue elements 50, 51 extend in between the plates 25, 26 of the cam member 21. The portions 61 of the tongues 50, 51 are respectively engageable by angularly spaced roller pins 62, 63 supported between the plates 25, 26. When the circuit breaker 11 is in its "on" position, as shown in Fig. 4, the circuit breaker 12 is in its "off" position and the levers 46 are rotated to the limit of their counterclockwise movement about their respective stub shafts and as viewed in Fig. 2 the tongue element 50 is located at approximately a 4 o'clock position with respect to the cam member 21 and the tongue element 51 at approximately at 10 o'clock position. With the breakers in the described position the roller pin 62 is positioned adjacent the lower side of the tongue element 50 so that counterclockwise rotation of the cam member 21 will cause engagement of the roller 62 with the underside of the portion 61 of the tongue element 50 to cause movement of the lever 46 in a clockwise direction about its shaft, and the pin 63 is positioned in a clockwise direction from the tongue element 51. After the cam member has been rotated a predetermined amount, the roller pin 63 will engage the portion 61 of the tongue element 51 to move the actuating lever 47 clockwise about its pivot and to actuate the circuit breaker 12 from its "off" toward its "on" position. When the actuating levers 46, 47 reach the limit of their movement in the direction which they are being actuated by the cam member 21, the tongue elements 50, 51 will yield to permit the roller pins 62, 63 to move past their respective tongue element. As soon as both of the roller pins 62, 63 have moved past their tongue elements, the motor 17 is stopped and the levers 46, 47 and the cam member 21 are in the position shown in Fig. 2. If it is desired to again transfer the load to the circuit breaker 11, the motor is operated in the reverse direction and, in this case, the roller pin 63 will first engage the tongue portion 61 of the tongue element 51 to move the circuit breaker 12 from its "on" position toward its "off" position, and the roller pin 62 will subsequently engage the tongue element 50 to actuate the lever 46 and move the circuit breaker 11 from its "off" position toward its "on" position.

Upon the completion of a transfer movement, the motor 19 is stopped by the actuation of a toggle switch 64 supported from the top of the pan 16 so that a toggle arm 65 thereof for operating the switch extends downwardly adjacent the side of plate 26 facing the gear box 22. The side of the plate 26 facing the gear box 22 carries a pair of angularly spaced switch actuating dogs 66, 67 which actuate the toggle switch after the cam member 21 has completed the transfer movement and the roller pins 62, 63 have cleared their respective tongue elements.

Figure 7:
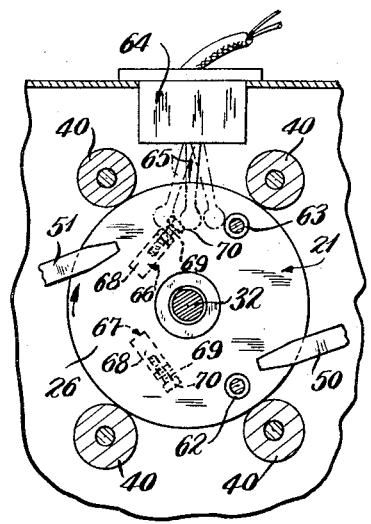
Fig. 7 is a framentary sectional view taken approximately along line 7—7 of Fig. 5.
Figure 8:
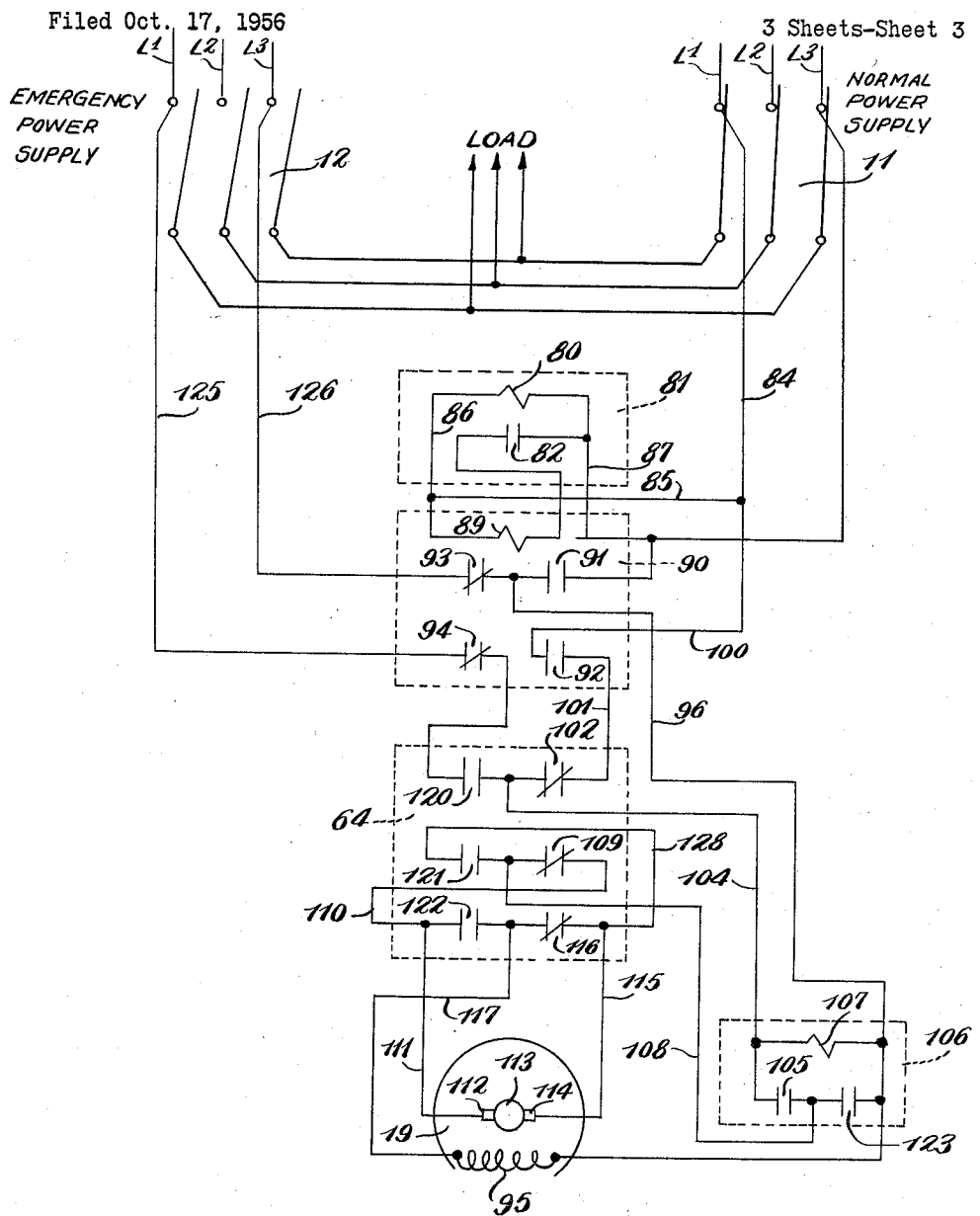
Fig. 8 is a schematic electrical diagram for the preferred embodiment of the present invention.

As is best shown in Fig. 7, the angularly spaced dogs 66, 67 each comprise a block member 68 fixed to the plate 26 and having a screw 69 threaded therein and extending therefrom. The screws have a head 70 thereon for engaging the toggle arm of the switch and actuating the same. As is best shown in Fig. 7, the head 70 of the dog 66 faces so that it actuates the toggle arm when the cam member 21 is rotated in a clockwise direction and the head 70 of the dog 67 faces in a direction so that it will actuate the toggle arm when the cam member 21 is rotated in a counterclockwise direction.

In Fig. 7, the cam member is shown in a position just after the roller pin 62 has cleared the tongue element 51 and the dog 66 has moved the switch arm to its center position. Continued movement of the cam member 21 in a clockwise direction will cause the toggle arm to move over center and to snap to the right-hand dotted position shown in Fig. 7 to stop the motor 19. When the cam member 21 is rotated counterclockwise, the dog 67 will engage the toggle arm of the switch when it is in its right-hand dotted position and move it until it snaps over center and moves to the left-hand dotted position shown in Fig. 7 to again stop the motor 19.

In order to assure that the cam member 21 is not rotated too far in either direction, a stop tongue 71 is supported so as to extend inwardly between the cam plates 25, 26. When the cam member 21 is rotated in a clockwise direction, the roller pin 62 will engage one side of the tongue 71 after it moves past the tongue element 50 to limit the rotation of the cam member 21 in a clockwise direction, and when the cam member 21 is rotated in a counterclockwise direction, the roller pin 63 will engage the other side of the stop tongue 71 after the roller pin has moved by the tongue element 51 to limit the movement of the cam member 21 in a counterclockwise direction.

The stop tongue 71 is supported in a manner similar to the tongue elements 50, 51 and the support, therefore, comprises a block 72 having a V-shaped cutout 73 in which the inner end of the tongue is positioned and which permits lateral movement of the tongue. The tongue 71 is biased to a central position in the V-shaped cutout 73 by springs 74, positioned about the opposite end portions of a shaft 75 which shaft is received in notches in the block 72 adjacent the V-shaped cutout 73 and extends through the block. The springs 74 engage the outer sides of the block 73 at one of their ends and nuts threaded onto the ends of the shaft at their other ends. The support for the tongue 71 provides a yieldable stop to limit the movement of the cam member 21.

As illustrated in the drawings and as hereinbefore stated, when the circuit breaker 11 is in its "off" position, the circuit breaker 12 is in its "on" position. Referring to Fig. 2, a rocker member 76 is pivotally secured to the upper side of the pan 16 by a pivot block 77 and has terminating portions 78, 79 respectively positioned adjacent the upper sides of the handles 13 for operating the circuit breakers 11, 12. When the handle 13 of the circuit breaker 12 is in its "on" position, as shown in Fig. 2, the rocker member 76 is rocked to a position where the terminating portion 78 extends downwardly below the "on" position of circuit breaker 11 to prevent the circuit breaker 11 from being thrown to an "on" position unless the circuit breaker 12 is moved toward its "off" position. Similarly, if the circuit breaker 11 is in its "on" position, the terminating portion 79 will act as a stop to prevent the handle 13 of circuit breaker 12 from moving to its "on" position as is best shown in Fig. 4.

The control circuit for the reversible motor 19 may be arranged so that the motor will automatically operate to disconnect the load from its normal power supply and to connect it to the emergency power supply upon total failure of the normal power supply, or upon partial failure of the normal power supply. In any case, the circuit is preferably arranged so that the transfer does not take place until the emergency power supply has been brought up to approximately full voltage. Fig. 7 is a schematic circuit diagram of a circuit for transferring a load from a normal power supply in the event of failure of the supply to an emergency power supply when the latter is brought up to approximately full voltage.

Referring to Fig. 7, when the normal power supply is energized, a circuit is completed for energizing a relay coil 80 of a relay 81 having normally open contacts 82. The circuit for energizing the relay 81 may be traced from L1 of the three-phase normal power supply through wire 84, wire 85, wire 86, relay coil 80 and wire 87 to the phase L3 of the power supply. The closing of the contacts 82 of the relay 81 completes a circuit for energizing a relay coil 89 of a relay 90 having normally open contacts 91, 92 and normally closed contacts 93, 94. The relay coil 89 is connected in a series circuit with the contacts 82 of the relay 81 with the series circuit being connected in parallel with the relay coil 80.

The closing of the normally open contacts 91 of the relay 89, upon the energization of the latter, completes a circuit to the L3 phase of the normal power supply from one side of a field coil 95 of the motor 19 which includes the contacts 91 and a wire 96 connected to the field coil 95. The closing of the contacts 92 of the relay 90 completes a circuit for connecting the other side of the field coil 95 to the phase L1 of the normal power supply. This latter circuit may be traced from L1 through the wire 84, wire 100, the now closed normally open contacts 92 of relay 90, wire 101, now closed contacts 102 of the switch 64, wire 104, normally open contacts 105 of a relay 106 controlled by a relay coil 107, wire 108, now closed contacts 109 of the switch 64, wire 110, wire 111 connected to a brush 112 of the armature 113 of the motor 19, brush 114 of the motor 19 connected to a wire 115, now closed contacts 116 of the switch 64, and a wire 117 connected to the field coil 95. The relay coil 107 will be energized immediately when the contacts 91, 92 are closed to close its normally open contacts 105 in the circuit just described. With the switch 64 in the position shown in the drawings, it can now be seen that when the normal power supply is energized, the coil 95 will be energized to operate the motor in one direction to rotate the cam member. The direction of operation of the motor 19 is such that the cam member 21 is rotated to first open the circuit breaker 12 and then close the circuit breaker 11. When the cam member 21 has been rotated sufficiently to close the breaker 11, the switch 64 will be actuated to open its contacts 102, 109, 116 and to close its contacts 120, 121 and 122. The opening of the contacts 102, 109, 116 of the switch 64 breaks the circuit for energizing the motor 19 and stops the operation of the motor. In addition to stopping the motor, the opening of the contacts 102, 109, 116 deenergizes the relay 106 to open its normally open contacts 105 and close its contacts 123 which are connected into the motor control circuit so as to connect the field coil and armature in series whenever they are closed and to provide a dynamic braking effect for the motor 19. As long as the normal power supply remains energized, the relays 81 and 90 will be energized, and the switch 103 is in a position with the contacts 102, 109, 116 open and the contacts 120, 121, 122 closed. The normally closed contacts 93, 94 of the relay 90 are in connections 125, 126 respectively connected to L1 and L3 of the emergency power supply. As long as the relay 90 is energized, the contacts 93, 94 are open and break the connection between the motor 19 and the emergency power supply.

Upon failure of the normal power supply, the relay 81, and in turn the relay 90, will be deenergized opening the contacts 91, 92 which control the circuit from the normal power supply to the motor 19 and closing contacts 93, 94 which control the connection of the motor 19 to the emergency power supply. Since the switch 64 is in a position where the contacts 120, 121, 122 are closed and the contacts 102, 109, 116 are open, a circuit for energizing relay 106 will be completed from L1 through connection 125, contacts 120, and wire 104, the relay coil 107 of the relay 106, wire 96 and contacts 93 and the connection to 126 to L3. The energization of relay 106 closes its normally open contacts 105 which connects the wire 104 which is connected to L1 of the emergency power supply through the contacts 120, as just described, to the motor 19. This circuit may be traced from the wire 104 through the contacts 105, wire 108, the now closed contacts 121 of the switch 64, wire 128, wire 115, brush 114, armature 113, and brush 112 of the motor 19, wire 111, now closed contacts 122 of the switch 103, wire 117, the field coil 95 and wire 96 which is connected to phase L3 of the emergency power supply through the connection 126. It will be noted that the relationship between the current flow in the armature and in the field of the motor 19 is reversed when the motor is energized from the emergency power supply from the relationship when the motor is energized from the normal power supply and, therefore, the motor 19 will operate in the opposite direction. The motor will continue operating in the opposite direction when energized from the emergency power supply until the switch 64 is actuated to open its contacts 120, 121, 122 to deenergize the motor 19 and the relay 106. When the relay 106 is deenergized, the contacts 123 once again close to effect a dynamic breaking effect for the motor 19.

Preferably the control circuit for the motor 19 is so arranged that the load is not transferred to the emergency power supply until the emergency power supply is brought up to approximately full voltage. In the illustrated circuit this is accomplished by using a relay 106 which is not actuated until a voltage is impressed thereacross which is approximately equal to the full voltage of the emergency power supply. When such a relay is used the contacts 105 will not close to energize the motor 19 to transfer the load until the emergency power supply is brought up to approximately full voltage.

The load may be transferred manually from the normal power supply to the emergency power supply or vice versa by pressing the operating handle 42 inwardly to disengage the key 35 from the slot 36 which in turn disconnects the cam member 21 from the double worm reduction drive from the motor 19. When the cam member 21 is disconnected from its drive, the handle 42 may be rotated to transfer the load to the desired power supply.

It will also be noted that the pan 16, the motor 19, the gear box 22, the cam 21, and the actuating levers 46, 47 form a compact conversion unit which may be readily installed to operate circuit breakers in existing installations.

It can now be seen that the objects heretofore enumerated and others have been accomplished and that the present invention provides a transfer mechanism for the operating first and second circuit breakers to actuate one of the circuit breakers to its off position when the other circuit breaker is operated to its on position and vice versa and that the transfer mechanism is simple and readily installed on existing installations and is particularly suitable for transferring an electrical load from its normal power supply to an emergency power supply upon failure of the normal power supply and the energization of the emergency power supply and to return the load to its normal power supply upon restoration of power therein.

The preferred embodiment of the present invention has been described in considerable detail and further modifications and constructions and arrangements will appear to those skilled in the art to which the invention relates and it is hereby my intention to cover all such modifications and constructions and arrangements which fall within the scope of the appended claims.

Having thus described my invention, I claim:

1. In a transfer mechanism for selectively transferring a load between first and second power supplies, first and second circuit breakers respectively operable to connect and disconnect the load to and from the first and second power supplies, a rotatable member reciprocable between first and second positions, a reversible rotary motor for reciprocating said member between said positions, circuit means for energizing said motor to operate said motor in either of two opposite directions to rotate said rotatable member between said positions, and actuating means operated by said member and effective to open said first circuit breaker and close said second circuit breaker when said rotatable member is rotated from said first position to said second position and to close said first circuit breaker and open said second circuit breaker when said rotatable member is rotated from said second position to said first position.

2. In a transfer mechanism for selectively transferring a load between first and second power supplies, first and second circuit breakers respectively operable to connect and disconnect the load to and from the first and second power supplies, a rotatable member reciprocable between first and second positions, a reversible rotary motor for reciprocating said member between said positions, circuit means for energizing said motor to operate said motor in one direction to rotate said rotatable member to said first position upon the energization of said first power supply and to operate said motor in a direction opposite to said one direction to rotate said rotatable member from said first position to said second position upon failure of power in said first power supply and the existence of power in said second power supply, and actuating means operated by said member and effective to open said first circuit breaker and close said second circuit breaker when said rotatable member is rotated from said first position to said second position and to close said first circuit breaker and open said second circuit breaker when said rotatable member is rotated from said second position to said first position.

3. In a transfer mechanism for selectively transferring a load between first and second power supplies, first and second circuit breakers respectively operable to connect and disconnect the load to and from the first and second power supplies, a rotatable member reciprocable between first and second positions, a reversible rotary motor for reciprocating said member between said positions, circuit means for energizing said motor to operate said motor in either of two opposite directions to rotate said rotatable member between said positions, and actuating means operated by said member and effective to open said first circuit breaker and close said second circuit breaker when said rotatable member is rotated from said first position to said second position and to close said first circuit breaker and open said second circuit breaker when said rotatable member is rotated from said second position to said first position comprising pivoted members each rotatable in opposite directions about its pivot to respectively open and close a respective one of said circuit breakers, said pivoted members having first ends engageable with said rotatable member.

4. In a transfer mechanism for selectively transferring a load between first and second power supplies, first and second circuit breakers respectively operable to connect and disconnect the load to and from the first and second power supplies, a rotatable member reciprocable between first and second positions, a reversible rotary motor for reciprocating said member between said positions, circuit means for energizing said motor to operate said motor in opposite directions to rotate said rotatable member between said positions, and actuating means operated by said member and effective to open said first circuit breaker and close said second circuit breaker when said rotatable member is rotated from said first position to said second position and to close said first circuit breaker and open said second circuit breaker when said rotatable member is rotated from said second position to said first position comprising pivoted members each rotatable in opposite directions about its pivot to respectively open and close a respective one of said circuit breakers, said pivoted members having first ends engageable with said rotatable member and being positioned on opposite sides of said rotatable member and being operated in opposite directions about their respective pivots for one direction of rotation of said rotatable member.

5. In a transfer mechanism, first and second circuit breakers each operable between two operative conditions, a rotatable member reciprocable about an axis between first and second positions, a pair of angularly spaced elements carried by said rotatable member, first and second actuating members on opposite sides of said rotatable member limited to movement between two positions for respectively actuating said first and second breakers between their said conditions and each extending into the path of movement of one of said elements, said elements engaging and moving said actuating members upon rotation of said rotatable member from said first position to said second position to operate each of said first and second circuit breakers to one of its conditions and upon rotation from said second position to said first position to actuate said first and second circuit breakers to the other ones of their said conditions, said actuating members comprising yieldable members engaged by said elements to permit the elements to move thereby when the actuating members reach the limit of their movements, and motor means for reciprocating said rotatable member between said positions.

6. In a transfer mechanism, first and second circuit breakers each including an actuating mechanism for operating the breaker between two operative conditions, a rotatable member reciprocable about an axis between first and second positions, a pair of angularly spaced elements carried by said rotatable member, first and second actuating members on opposite sides of said rotatable member limited to movement between two positions for actuating said breakers between said conditions, means pivotally mounting said actuating members for pivotal movement in planes perpendicular to said axis with the median position of said actuating members between their said positions lying along a line perpendicular to said axis, the end of each of said actuating members adjacent said rotatable member extending into the path of one of said elements and the other ends of said actuating members being operatively connected to the actuating mechanisms for said circuit breakers, said elements engaging first sides of said actuating members for moving the latter upon rotation of said rotatable member from said first position to said second position to actuate each of said circuit breakers to one of its conditions and other sides of said actuating members for moving the latter upon rotation from said first position to said second position to actuate each of said circuit breakers to the other of its conditions, and a motor means for reciprocating said rotatable member.

7. In a mechanism for operating first and second circuit breakers each including an actuating mechanism for operating the breaker between two operative conditions, a rotatable member reciprocable about an axis between first and second positions, a pair of angularly spaced elements carried by said rotatable member, first and second actuating members on opposite sides of said rotatable member limited to movement between first and second angularly spaced positions for respectively actuating said breakers between their said conditions, means pivotally mounting said actuating members for pivotal movement in planes perpendicular to said axis with the median position of said actuating members between their first and second positions lying along a line perpendicular to said axis and each of said actuating members defining equal angles with said line when in the said first and second positions of the actuating member, the end of each of said actuating members adjacent said rotatable member extending into the path of one of said elements and the other ends of said actuating members being operatively connected to the actuating mechanisms for said circuit breakers, said elements engaging first sides of said actuating members for moving the latter upon rotation of said rotatable member from its said first position to its said second position to actuate each of said breakers to one of its operative conditions and the other sides of said actuating members for moving the latter upon rotation of said rotatable member from its said first position to said second position to actuate each of said breakers to the other of its said conditions, and reversible motor means for reciprocating said rotatable member.

8. In a transfer mechanism for selectively transferring a load between first and second power supplies, first and second circuit breakers respectively operable to connect and disconnect the load to and from the first and second power supplies and each including an actuating mechanism for operating the breaker, a rotatable member reciprocable about an axis between first and second positions, a pair of angularly spaced elements carried by said rotatable member, first and second actuating members on opposite sides of said rotatable member limited to movement between first and second positions for actuating said breakers between open and closed positions, means pivotally mounting said actuating members for pivotal movement in planes perpendicular to said axis with the median position of said actuating members between their first and second positions lying along a line perpendicular to said axis, the end of each of said actuating members adjacent said rotatable member extending into the path of one of said elements and the other ends of said actuating members being operatively connected to the actuating mechanisms for said circuit breakers, said elements engaging first sides of said actuating members to move the latter upon rotation of said rotatable member from its said first position to its said second position to open one of said circuit breakers and close the other of said circuit breakers and other sides of said actuating members upon rotation of said rotatable member from its said first position to its said second position to open said other circuit breaker and close said one circuit breaker, a reversible motor for reciprocating said rotatable member, and circuit means for controlling the operation of said motor comprising means responsive to the existence of power in said first power supply to rotate said reciprocable member to its said first position and to the failure of power in said first power supply and the existence of power in said second power supply to rotate said member to its said second position.

9. In a transfer mechanism for selectively transferring a load between first and second power supplies, first and second circuit breakers respectively operable to connect and disconnect the load to and from the first and second power supplies and each including an actuating mechanism for operating the breaker, a rotatable member reciprocable about an axis between first and second positions, a pair of angularly spaced elements carried by said rotatable member, first and second actuating members on opposite sides of said rotatable member limited to movement between first and second positions for actuating said breakers between open and closed positions, means pivotally mounting said actuating members for pivotal movement in planes perpendicular to said axis with the median position of said actuating members between their first and second positions lying along a line perpendicular to said axis, the end of each of said actuating members adjacent said rotatable member extending into the path of one of said elements and the other ends of said actuating members being operatively connected to the actuating mechanisms for said circuit breakers, said elements engaging first sides of said actuating members to move the latter upon rotation of said rotatable member from its said first position to its said second position to open one of said circuit breakers and close the other of said circuit breakers and other sides of said actuating members upon rotation of said rotatable member from its said first position to its said second position to open said other circuit breaker and close said one circuit breaker, said actuating members comprising yieldable members engaged by said elements to permit the elements to move thereby when the actuating members reach the limit of their movements about their pivots, a reversible motor for reciprocating said rotatable member, and circuit means for controlling the operation of said motor comprising means responsive to the existence of power in said first power supply to rotate said reciprocable member to its said first position and to the failure of power in said first power supply and the existence of power in said second power supply to rotate said member to its said second position.

10. In a mechanism for operating first and second circuit breakers and for actuating the first circuit breaker to an open position when the second circuit breaker is moved to a closed position and vice versa comprising a reciprocable member operable between two positions, actuating means interconnecting said reciprocable member and said circuit breakers to operate said circuit breakers to one of their positions when the reciprocable member is moved in one direction and to the other of their positions when moved in the opposite direction, power actuated means for reciprocating said member, a drive interconnecting said power actuated means and said member and including an element movable to disengage the drive from the member, and manual means operable to disengage the drive and for manually rotating said member upon disengagement of the drive.

11. In a mechanism for operating first and second circuit breakers between open and closed positions, a rotatable cam member reciprocable in one direction to actuate the first circuit breaker to one of its positions and the second circuit breaker to one of its positions and in an opposite direction to actuate the circuit breakers to their other positions, a drive shaft member coaxial with the axis of rotation of said member, a key carried by one of said members receivable in a slot in the other of said members, said members being supported for relative movement to selectively engage and disengage said key and slot, means yieldably urging said members to a position where said key is engageable with said slot, and a manual control element for relatively moving said members to disengage said key and for manually rotating said cam member to effect operation of said circuit breakers.

12. In a mechanism for simultaneously operating first and second circuit breakers between open and closed positions, a rotatable cam member reciprocable in one direction to actuate the first circuit breaker to one of its positions and the second circuit breaker to one of its positions and in an opposite direction to actuate the circuit breakers to their other positions, a drive shaft coaxial with the axis of rotation of said member and supporting said member for axial and rotative movement with respect thereto, a key carried by said drive shaft and receivable in a slot in said member, means urging said member to a position on said shaft where said key is engageable with said slot, and a manual control element for relatively moving said member on said drive shaft to disengage said key and for manually rotating said member to effect operation of said circuit breakers.

13. A conversion unit for simultaneously moving the operating handles of side-by-side circuit breakers comprising a support member adapted to span the first and second circuit breakers, pivoted levers movable about their pivots to actuate said breakers and supported by said support member and each having one end adapted to engage and operate the operating handle of a respective one of said circuit breakers upon movement of the lever about its pivot, a rotatable cam member supported by said support member intermediate said pivoted levers and engageable with the latter to operate the latter about their pivots in a direction dependent upon the direction of rotation of the member, a reversible motor supported by said support member, drive means operatively connecting said motor to said rotatable member for reciprocating the latter including a pair of relatively movable engaged elements disengageable to disconnect the drive means from the motor, a manual operating handle rotatable to reciprocate said member about its axis and movable to disengage said elements, said manual operating handle being supported by said support member.

14. A conversion unit for simultaneously moving the operating handles of side-by-side circuit breakers to actuate the breakers comprising a support member adapted to span the first and second circuit breakers and having a first side facing said breakers, pivoted levers supported by said support member adjacent said first side and each having one end adapted to engage and operate the operating handle of a respective one of said circuit breakers upon movement of the lever about its pivot, a rotatable and axially movable cam member supported by said support member intermediate said pivoted levers and engageable with the latter to operate the latter about their pivots in a direction dependent upon the direction of rotation of the member, a reversible motor supported by said support member, drive means operatively connecting said motor to said rotatable member for reciprocating the latter including a pair of elements engageable and disengageable upon relative axial movement of said cam member to respectively connect and disconnect the drive means from the cam member, means yieldably urging said cam member axially to engage said elements, and a manual operating handle extending through an opening in said support member and fixed to said cam member and rotatable to reciprocate said rotatable member and operable to move said cam member axially to disengage said elements.

15. In a transfer mechanism, first and second circuit breakers operable between first and second conditions, a rotatable member reciprocable between first and second positions, motor means for reciprocating said member between said positions, and actuating means operated by said rotatable member effective to actuate said first circuit breaker to one of its conditions and said second circuit breaker to one of its conditions when said rotatable member is rotated from said first position to said second position and to operate said circuit breakers to the other ones of their said conditions when said rotatable member is rotated from its said second position to its said first position comprising first and second pivoted members on opposite sides of said rotatable member, said pivoted members including an element engageable with said rotatable member and a yieldable force transmitting connection connecting said element with the respective pivoted member, means carried by said rotatable member engageable with one side of said elements to move said pivoted members about their pivots upon rotation of said rotatable member in one direction and engageable with the other sides of said elements to move said pivoted members in the opposite directions upon rotation of said rotatable member in its other direction, said yieldable connection permitting said means to move by said elements.

16. In a transfer mechanism, first and second circuit breakers actuable between first and second conditions, a rotatable member reciprocable about an axis between first and second positions, a pair of angularly spaced elements carried by said rotatable member, first and second actuating members on opposite sides of said rotatable member each limited to movement between two positions for actuating a respective one of said breakers between its first and second conditions and each of said actuating members extending into the path of movement of one of said elements, said elements engaging and moving said actuating members upon rotation of said rotatable member from its said first position to its said second position to actuate each of said first and second circuit breakers to one of its conditions and upon rotation from said second position to said first position to operate said first and second circuit breakers to the other ones of their conditions, said actuating members comprising yieldable members engaged by said elements to permit the elements to move thereby when the actuating members reach the limit of their movements, a reversible rotary electric motor for reciprocating said rotatable member between its said positions, and circuit means for controlling said motor and energizable to effect operation of said motor in either of two opposite directions to rotate said rotatable member from either of its positions to the other.

17. In a transfer mechanism, first and second circuit breakers actuatable between first and second conditions, a rotatable member reciprocable about an axis between first and second positions, a pair of angularly spaced elements carried by said rotatable member, first and second actuating members on opposite sides of said rotatable member each limited to movement between two positions for actuating a respective one of said breakers between its first and second conditions and each of said actuating members extending into the path of movement of one of said elements, said elements engaging and moving said actuating members upon rotation of said rotatable member from its said first position to its said second position to actuate each of said first and second circuit breakers to one of its conditions and upon rotation from said second position to said first position to operate said first and second circuit breakers to the other ones of their conditions, said actuating members comprising yieldable members engaged by said elements to permit the elements to move thereby when the actuating members reach the limit of their movements, a reversible rotary electric motor for reciprocating said rotatable member between its said positions, and circuit means for controlling said motor and energizable to effect operation of said motor in either of two opposite directions to rotate said rotatable member from either of its positions to the other and limit switch means for stopping the operation of said motor after said circuit breakers are actuated and said elements have cleared said yieldable members upon operation of said rotatable member in either direction to actuate said circuit breakers.

18. In a mechanism for simultaneously operating first and second circuit breakers between two operative conditions, a reciprocable member operable between two positions, actuating means interconnecting said reciprocable member and said circuit breakers to operate each of said circuit breakers to one of its conditions when the reciprocable member is moved in one direction and to the other of its conditions when the reciprocable member is moved in the opposite direction, power actuated means for reciprocating said member, a drive interconnecting said power actuated means and said member and including an element movable to disengage the drive from the member, and manual means operable to disengage the drive and for manually rotating said member upon disengagement of the drive.

19. In a transfer mechanism, first and second circuit breakers each including an actuating mechanism for operating the breaker between two operative conditions, a rotatable member reciprocable about an axis between first and second positions, a pair of angularly spaced elements carried by said rotatable member, first and second actuating members on opposite sides of said rotatable member limited to movement between two positions for actuating said breakers between said conditions, means pivotally mounting said actuating members for pivotal movement in planes perpendicular to said axis with the median position of said actuating members between their said positions lying along a line perpendicular to said axis, the end of each of said actuating members adjacent said rotatable member extending into the path of one of said elements and the other ends of said actuating members being operatively connected to the actuating mechanisms for said circuit breakers, said elements engaging first sides of said actuating members for moving the latter upon rotation of said rotatable member from said first position to said second position to actuate each of said breakers to one of its conditions and other sides of said actuating members for moving the latter upon rotation from said first position to said second position to actuate each of said breakers to the other of its conditions, said actuating members comprising yieldable members engaged by said elements to permit the elements to move thereby when the actuating members reach the limit of their movements about their pivots, and a reversible motor for reciprocating said rotatable member.

References Cited in the file of this patent

UNITED STATES PATENTS

| | | |
|---|---|---|
| 2,025,653 | Dyer | Dec. 24, 1935 |
| 2,172,950 | Anderson | Sept. 12, 1939 |